United States Patent Office 3,404,110

Patented Oct. 1, 1968

1

3,404,110

WATER DILUTABLE SALTS OF ADDITION COPOLYMERS OF (1) AN ACID, (2) AN ETHER, (3) A CARBOXYL-FREE MONOMER AND (4) A DRYING OIL ACID OR ADDUCT THEREOF

Thomas Hunt, Cadoxton, Barry, Glamorgan, Wales, assignor to The Distillers Company Limited, Edinburgh, Scotland, a British company No Drawing. Filed Mar. 30, 1965, Ser. No. 444,070

Claims priority, application Great Britain, Apr. 25, 1964, 17,265/64

16 Claims. (Cl. 260—23.5)

ABSTRACT OF THE DISCLOSURE

Addition copolymers the salts of which are suitable for water dilutable surface coating compositions and compositions containing these salts. The copolymers are formed by addition polymerizing an $\alpha,\beta$ - ethylenically unsaturated carboxylic acid, e.g., acrylic acid, a polyethylenically unsaturated compound containing at least one $\beta,\gamma$ - ethylenically unsaturated ether group and an ethylenically unsaturated group through which addition copolymerization can take place, e.g., glycerol diallyl ether, an ethylenically unsaturated monomer free from carboxylic acid and carboxylic acid anhydride groups, e.g., styrene and a drying oil fatty acid, e.g., dehydrated castor oil fatty acid or an adduct of such an oil with an acyclic $\alpha$ - saturated olefinic polycarboxylic acid, e.g., maleic acid to give a copolymer having an acid value of at least 25 milligrams of potassium hydroxide per gram.

The present invention relates to addition copolymers, methods for their preparation, water dilutable salts thereof, a method for preparing these salts and aqueous surface coating compositions thereof.

It is an object of the present invention to provide addition copolymers whose salts can be diluted to form a basis for aqueous surface coating compositions which are capable of drying in air to give films or coatings which rapidly harden due to autoxidation. The resultant films or coatings are water soluble and have good appearance and durability.

Accordingly the present invention is an addition copolymer comprising units formed by the copolymerisation of (1) an $\alpha,\beta$ - ethylenically unsaturated carboxylic acid (2) a polyethylenically unsaturated compound containing at least one $\beta,\gamma$ - ethylenically unsaturated ether group and an ethylenically unsaturated group through which addition polymerisation can take place, (3) an ethylenically unsaturated monomer free from carboxylic acid and carboxylic acid anhydride groups which is capable of undergoing addition polymerisation to form addition copolymers with the other components of the copolymer, and (4) a drying oil fatty acid and/or an adduct of a drying oil fatty acid and an acyclic $\alpha$-unsaturated olefinic polycarboxylic acid having a straight chain length of up to 5 carbon atoms and simple derivatives thereof, said copolymer having an acid value of at least 25 milligrams of potassium hydroxide per gram.

Most suitably the $\alpha,\beta$ - ethylenically unsaturated carboxylic acids are mono or dibasic. The preferred $\alpha,\beta$-ethylenically unsaturated carboxylic acids are mono carboxylic acids having a straight chain length of at most 5 carbon atoms such as acrylic or methacrylic acids. Itaconic, maleic or fumaric acids are examples of suitable dicarboxylic acids. The proportion by weight of residues of the $\alpha,\beta$ - ethylenically unsaturated carboxylic acid in relation to the total weight of residues of components (1), (2), (3) and (4) in the addition copolymer is preferably in the range 2 to 10 percent. The proportion of acid residue should most suitably give an addition copolymer having an acid value in the range 25 to 100 milligrams of potassium hydroxide per gram and preferably in the range 40 to 70 milligrams potassium hydroxide per gram.

2

The acid value must be determined by a method which estimates each carboxylic anhydride group present in the copolymer as two carboxylic acid groups.

Any polyethylenically unsaturated compound containing at least one $\beta,\gamma$ - ethylenically unsaturated ether group and an ethylenically unsaturated group through which addition polymerisation can take place can be used as an essential component from which the copolymer can be formed. When the compound contains only one $\beta,\gamma$-ethylenically unsaturated ether group the remaining ethylenically unsaturated group may for example consist of a vinyl group. The preferred compounds are the allyl methallyl or ethallyl ethers of alcohols or epoxy compounds having a straight chain length of at most 12 carbon atoms. Examples of suitable alcohols are sorbitol, glycerol and trimethylol propane. Some examples of suitable ethers are vinyl allyl ether, diallyl ether, vinyl methallyl ether, the glycerol diallyl ethers, the trimethylol propane diallyl ethers, glycerol triallyl ether, ethylene glycol diallyl ether, the di, tri and tetra allyl ethers, pentaerythritol and the corresponding methallyl ethers and sorbitol tetra allyl ether and its corresponding methallyl ethers. The polyethylenically unsaturated compound can contain free hydroxyl groups which can be esterified or partially esterified with unsaturated drying oil fatty acids such as dehydrated castor oil fatty acids preferably before addition polymerisation to form the copolymer. They can also be esterified with acyclic olefinic carboxylic acids to form esters such as the ethylene glycol mono allyl ether mono ester of maleic acid. The preferred compound containing at least one $\beta,\gamma$-ethylenically unsaturated ether group is a glycerol diallyl ether.

The proportion by weight of residues of the polyethylenically unsaturated ether compound in relation to the total weight of residues of components (1), (2), (3) and (4) in the addition copolymer formed is preferably in the range from 10 to 60 percent.

The ethylenically unsaturated monomer free from carboxylic acid and carboxylic anhydride groups must be capable of undergoing addition polymerisation to form addition copolymers with the other components of the copolymer. Most suitably the monomers are aromatic compounds containing vinyl unsaturation or vinyl esters or esters or amides of $\alpha,\beta$-ethylenically unsaturated carboxylic acids. Typical examples are styrene, vinyl toluene, $\alpha$-substituted lower alkyl styrenes having up to 4 carbon atoms in the alkyl group such as $\alpha$-methylstyrene, and alkyl esters of acrylic acid such as ethyl acrylate, methyl methacrylate, or mixtures thereof. Plasticising monomers such as triethylene glycol esterified with an equimolar quantity of dehydrated castor oil fatty acids may also be used. At least 10% by weight of residues of these monomers should preferably be present in relation to the total weight of residues of components (1), (2), (3) and (4).

The drying oil fatty acids are generally formed by hydrolytically splitting drying oils. Some examples of drying oil fatty acids are the tall oil fatty acids and the fatty acids derived from the following oils, dehydrated castor, perilla, tung, oiticia, linseed, cotton seed, sunflower, tobacco seed, soya, safflower seed and unsaturated fish oils. The preferred drying oil acids have at least 18 carbon atoms per molecule. Proportion by weight of residues of the drying oil fatty acid in relation to the total weight of residues of components (1), (2), (3) and (4) in the addition copolymer should be in the range 4 to 45%. However from 20 to 45% is usually sufficient to ensure that the copolymer has adequate flexibility when used as a surface coating.

The drying oil fatty acid component of the adduct of a drying oil fatty acid and the acylic α-unsaturated olefinic polycarboxylic acid having a straight chain length of at most 5 carbon atoms can be any of the drying oil fatty acids mentioned in the previous paragraph.

The acyclic α-unsaturated olefinic polycarboxylic acid component of the adduct can be for example fumaric, maleic, aconitic, itaconic and alkyl substituted maleic acids. The preferred acid is maleic acid. Simple derivatives of these acids include anhydrides such as citraconic anhydride, citric acid when subjected to conditions under which citraconic anhydride or itaconic acid is formed (Bernthsen, Textbook of Organic Chemistry 1932, pp. 250–256) and partial esters where the acid is a polycarboxylic e.g. maleic acid partially esterified with an aliphatic alcohol.

The reaction conditions by which the adduct can be formed between the drying oil fatty acid and the compound having an available residue of an acyclic α-unsaturated olefinic carboxylic acid are known and the addition products for use in the present invention can be prepared by these known procedures.

The proportion by weight of residues of the adduct in relation to the total weight of residues of components (1), (2), (3) and (4) in the addition copolymer are most suitably in the range 3 to 26%.

The proportion by weight of the residues of the polyethylenically unsaturated compound containing β,α-ethylenically unsaturated ether groups (2) together with the residues of the drying oil and/or the adduct thereof (4) should preferably be in the range 20 to 80% of the total weight of residues of components (1), (2), (3) and (4).

The addition copolymers of the present invention can be prepared by reacting a monomeric mixture of the components hereinbefore described using known techniques for addition polymerisation. These techniques include heating the monomeric mixture in the presence of a free radical catalyst under reflux at atmospheric pressure. The temperature can vary over a wide range but is preferably from 50 to 200° C. Examples of suitable free radical catalysts are compounds such as azobisisobutyronitrile or organic peroxides or hydroperoxides such as ditertiary butyl peroxide, benzoyl peroxide, dicumyl peroxide and cumene hydroperoxide. All the monomeric components can be mixed together and then polymerised. Alternatively one or more components of the reaction mixture can be added to the other components during the copolymerisation for example the α,β-ethylenically unsaturated carboxylic acid and the monomer free from carboxylic acid and carboxylic acid anhydride groups can be added slowly to a mixture of the other monomers while stirring at the temperature of polymerisation.

The preferred proportions of the monomers used to form the copolymers are the same as those hereinbefore given for the residues of the components. However the proportion of the polyethylenically unsaturated compound containing at least one β,α-ethylenically unsaturated ether group (2) which can comprise from 10 to 75% by weight of the total weight of the other monomers.

A preferred process for preparing the addition copolymers comprises addition polymerising the monomeric mixture containing the components hereinbefore defined in the presence of a chain stopper to give a copolymer having an acid value of at least 25 milligrams of potassium hydroxide per gram.

It is desirable to use this preferred process to prevent gelation and limit the molecular weight of the copolymer when the amount of drying oil fatty acid and/or the adduct is at the lower end of the preferred range or when the amount of drying oil fatty acid and/or the adduct (4) together with the polyethylenically unsaturated compound (2) is at the lower end of the 20–80% range.

By the term chain stopper is meant throughout this specification and claims a compound which has a chain transfer constant for styrene polymerisation at 60° C. of at least $0.5 \times 10^{-4}$.

Where the chain stopper is a solvent such as allyl alcohol or a chlorinated hydrocarbon such as carbon tetra chloride the proportion of solvent in relation to the total weight of monomer material from which the copolymer can be formed can vary widely and is dependent upon the tendency of the particular mixture to gel. In general the proportion need not be more than 60% by weight of the total weight of monomers. Comopunds having very high chain transfer constants such as mercaptans can be used by dissolving them in small amounts in the polymerisable monomers to give the required chain transfer value.

When the amount of polyethylenically unsaturated compound (2) initially present in the monomeric mixture approaches the upper limit of the preferred range, it may be necessary to remove some unreacted monomers when the polymerisation is complete in order to obtain a completely water soluble product. This may be done using normal distillation, under atmospheric or reduced pressure, or steam distillation may be used.

The addition copolymers according to the present invention are water dilutable when formed into salts. By water dilutable is meant throughout this specification that the salt of the addition copolymers formed in the presence of a base, can be either dissolved in water or in water containing a water miscible solvent or dispersed to form an emulsion in water or water containing a water miscible solvent, the formed solution or emulsion being capable of being diluted with water without precipitation occurring. Examples of suitable water miscible solvents are ethyl, propyl and butyl alcohols and butyl, ethyl and methyl Cellosolve.

The present invention is further a method for preparing water dilutable salts of the addition copolymers which comprises treating the addition copolymer hereinbefore defined with a base in the presence of water or water containing a water miscible solvent.

Preferably sufficient base is used to neutralise all the carboxyl groups in the copolymer although this may not be necessary where the copolymers have an acid value in the higher end of the described range or in cases where a pH of about 7 is required in the solution. The process for preparing the salts can be carried out at room temperature but higher temperatures, for example 100° C. can be employed if desired.

The preferred bases are ammonia or volatile organic bases such as triethylamine since they are at least partially removed by evaporation when aqueous compositions containing the salts of the copolymer are applied to form coatings or films. However, it may be convenient to use less volatile bases such as dimethylamino ethanol or morpholine, particularly when elevated temperatures are employed to accelerate the drying process. Inorganic bases such as lithium and sodium hydroxides may also be used.

Aqueous solutions or emulsions of the water dilutable addition copolymer salts can be used to form surface coating compositions such as film forming paints and the like. The usual metallic driers, e.g. cobalt naphthenate, fillers and pigments are generally present in these compositions. It is often advantageous to include water miscible solvents such as butyl or methyl Cellosolve in these compositions in order to improve water solubility, cut viscosity and adjust flow characteristics.

Aqueous surface coating compositions containing these salts can be applied to surfaces in the usual manner such as for example by dipping, flow coating, electro deposition or spraying. These compositions can be air dried or converted to their final hardened state by heating.

The following examples illustrate the addition copolymers according to the present invention, their manufacture, water dilutable salts thereof and aqueous surface compositions containing these salts.

Example 1

Dehydrated castor oil fatty acids (115 grams) and glycerol dially ether (157 grams) were stirred and heated to 130–140° C. When this temperature was reached, a solution of acrylic acid (17 grams) and ditertiary butyl peroxide (10 grams) in styrene (200 grams) was added slowly over 3 hours, holding the reaction mixture at 130–140° C.

Heating and stirring at 130–140° C. were continued for a further 3½ hours, then butyl Cellosolve (100 grams) was charged and the viscous solution allowed to cool below 100° C.

The resin which had an acid value of approximately 70 milligrams of KOH per gram was converted to its triethylamine salt by stirring with triethylamine (45 grams) and when this had thoroughly dispersed, sufficient water dispersible cobalt drier to give 0.12% cobalt on solid resin was added.

Films of the above solution, diluted with water were touch dry in 1¾ hours and tack free after 3 hours. The films were colourless, hard and glossy with good water resistance.

Example 2

Glycerol dially ether (132 grams) dehydrated castor oil fatty acids (105 grams) and an ester prepared from equimolar quantities of triethylene glycol and dehydrated castor oil fatty acids (60 grams) were stirred and heated to 130–140° C.

When this temperature range was reached, a solution of acrylic acid (18 grams) and ditertiary butyl peroxide (10 grams) in styrene (175 grams) was added slowly over 3 hours, holding the temperature at 130–140° C.

After all the monomers had been added, the heating and stirring at 130–140° C. were continued for 5 hours and then butyl Cellosolve (100 grams) was charged and the batch allowed to cool below 100° C.

The resin which had an acid value of approximately 70 milligrams of KOH per gram was neutralised by stirring with triethylamine (45 grams) and when this had been stirred in water dispersible cobalt drier was added to give a concentration of 0.12% cobalt on solid resin.

Films of the above solution, diluted with water were touch dry in 2 hours and tack free after air drying overnight. The films were colourless and glossy with excellent mar resistance.

Example 3

Glycerol diallyl ether (391 grams) and dehydrated castor oil fatty acids (63 grams) were stirred and heated to 130–140° C. When this temperature was reached, a solution of acrylic acid (63 grams), styrene (468 grams), ditertiary butyl peroxide (9 grams) in allyl alcohol (99 grams) was added over 3 hours. During this addition the reaction temperature gradually dropped due to refluxing allyl alcohol and when all the monomers had been charged the batch was refluxing gently at 120° C.

The reflux was continued for a further 3 hours and then allyl alcohol and unreacted monomers were stripped off under reduced pressure until no further distillation occurred at 110° C. and 25 mm. Hg. The yield of colourless copolymer was 942 grams. The acid value of this copolymer was 65 milligrams of potassium hydroxide per gram.

The copolymer (10 grams), butyl Cellosolve (2 grams), triethylamine (1 gram), and water dispersible cobalt drier (0.1 ml. giving roughly 0.06% cobalt on resin solids) were thoroughly mixed and then diluted with water to a viscosity suitable for film application. Films laid on glass plates were dry to touch in 2 hours and hard dry overnight. The hard films were colourless with good gloss, mar resistant and water resistant.

Example 4

Sorbitol tetra allyl ether (129 grams) and dehydrated castor oil fatty acids (42 grams) were heated to 130–140° C. and a mixture of acrylic acid (15 grams), styrene (156 grams), allyl alcohol (66 grams) and ditertiary butyl peroxide (2.25 grams) were added slowly over 3 hours. When the addition was complete, refluxing was continued for a further 3 hours then unreacted monomers and allyl alcohol were vacuum distilled at up to 100° C. and 25 mm. Hg.

The product at this stage had an acid value of about 70 milligrams of potassium hydroxide per gram. This product was easily stirrable at 100° C. and when a sample (10 grams) was stirred with butyl Cellosolve (2 grams) and triethylamine (1 gram) the resulting solution could be diluted with water.

An aqueous triethylamine salt solution containing 0.12% cobalt on copolymer as water dispersible cobalt drier, gave hard, glossy and water resistant films after air drying overnight.

Example 5

An addition product of a soya fatty acid and maleic anhydride was prepared by heating equimolecular quantities of these compounds to 220–225° C. for 7 hours under nitrogen. 21 grams of this addition product and 130 grams of glycerol diallyl ether were heated to 130° C. and a mixture of 156 grams of styrene, 21 grams of acrylic acid, 3 grams of tertiary butyl peroxide and 42.9 grams of allyl alcohol were then added over 3 hours. When this addition was complete the batch was refluxed gently at 125° C. Stirring and refluxing were contained for 1½ hours when allyl alcohol and unreacted monomers were distilled off under a reduced pressure of 25 millimeters of mercury at a batch temperature of 110° C. until no distillation was noticeable. The acid value of this copolymer was 75 milligrams of potassium hydroxide per gram.

The residual addition copolymer (292 grams) was then stirred with 2-butoxy ethanol (58.4 grams) and triethylamine (36 grams) followed by water dispersible cobalt driers containing 6% cobalt metal (5.8 grams) until the drier was completely dispersed when 96 millilitres of water was then stirred in.

Films of this water dilutable surface coating composition were touch dry in 3½ hours and tack free when left overnight.

Example 6

Glycerol dially ether (31 grams), dehydrated castor oil fatty acids (5 grams), and an ester prepared by reacting equimolar quantities of triethylene glycol and dehydrated castor oil fatty acids (25 grams) were heated and stirred to 130–140° C.

When this temperature range was reached, a solution of acrylic acid (2 grams) and ditertiary butyl peroxide (2 grams) in styrene (35 grams) was added slowly over 3 hours holding the temperature at 130–140° C.

After all the monomers had been added heating at 130–140° C. was continued for 3 hours and then the copolymer which had an acid value of 26 milligrams of potassium hydroxide per gram was cooled to room temperature.

A sample (10 grams) was extracted and stirred with butyl Cellosolve (2 grams) and triethylamine (0.7 ml.). The resulting triethylamine salt was completely soluble in water.

Films of the aqueous salt solution, containing 0.12% cobalt metal on solid resin as water dispersible cobalt drier, were touch dry in 6 hours and tack free overnight.

Example 7

Glycerol diallyl ether (23 grams), dehydrated castor oil fatty acids (16.8 grams) and an ester prepared from equimolar quantities of triethylene glycol and dehydrated castor oil fatty acids (13.2 grams) were heated and stirred to 130–140° C.

When this temperature range was reached, a solution of methacrylic acid (10 grams) and ditertiary butyl peroxide (2 grams) in vinyl toluene (35 grams) was added slowly over 3 hours, holding the temperature at 130–140° C.

After all the monomers had been added, heating at 130–140° C. was continued for 30 minutes and then the viscous copolymer which had an acid value of 90 mg. KOH/ gm. was thinned with butyl Cellosolve (20 grams) before cooling to room temperature.

A sample of the resin solution (12 grams) was stirred with triethylamine (1 gram) followed by water dispersible cobalt drier containing 6% cobalt metal (0.2 ml.) and this solution was thinned with water to 35% solids. Films were touch dry in 2¼ hours and sand dry in 2½ hours. The films were hard and mar resistant after drying overnight.

Example 8

Trimethylol propane diallyl ether (107 grams), dehydrated castor oil fatty acids (14 grams) were heated to 130° C. and a solution of methacrylic acid (12.5 grams), ditertiary butyl peroxide (1.25 grams) in styrene (52 grams) was added slowly over 3 hours.

When the addition was completed, heating at 130–140° C. was continued for 3 hours and at this stage a triethylamine salt became cloudy when diluted with water. Unreacted trimethylol propane diallyl ether was removed by blowing a stream of steam through the copolymer heated at 130–140° C. with the condenser set for distillation. After 1½ hours steam distillation, 44 grams monomer had been removed leaving a copolymer with acid value approximately 75 mg. KOH per gram.

A sample of resin (10 grams) was stirred with butyl Cellosolve (2 grams), triethylamine (1.3 ml.) and water dispersible cobalt drier containing 6% cobalt metal (0.2 ml.). This solution remained clear when diluted with water to a suitable viscosity for film application. Films were touch dry in 1½ hours and tack free in about 5 hours.

Example 9

Glycerol diallyl ether (52.8 grams) and dehydrated castor oil fatty acids (46 grams) were heated to 130–140° C. and a solution of acrylic acid (7.2 grams), ditertiary butyl peroxide (4.0 grams), butyl acrylate (30 grams) in styrene (60 grams) was added slowly over 3 hours, holding the temperature at 130–140° C.

When the addition had been completed, heating at 130–140° C. was continued for 2 hours and then butyl Cellosolve (40 grams) was charged to the viscous copolymer which had an acid value of about 70 mg. KOH/gm.

After cooling to room temperature, triethlyamine (16 grams), water dispersible cobalt driers containing 6% cobalt metal (4 grams) were stirred in. This solution was diluted with water to a reasonable viscosity for film application and air dried films were dry to touch in 4 hours, tack free overnight.

Example 10

Glycerol diallyl ether (79.2 grams), sunflower fatty acids (69 grams) were heated to 130–140° C. and a mixture of styrene (120 grams), butyl acrylate (15 grams), acrylic acid (10.8 grams) and ditertiary butyl peroxide (6 grams) added slowly over 3 hours.

When the addition was completed, heating at 130–140° C. was continued for 3½ hours and then the copolymer which had an acid value of approximately 70 mg. KOH/gm. was allowed to cool to room temperature.

The resin was converted to its triethylamine salt by stirring with triethylamine (25.2 grams) and butyl Cellosolve (60 grams). Water dispersible cobalt drier containing 6% cobalt metal (6 grams) was added and when this had completely stirred in, the solution was diluted to 50% solids with water.

Films of the above solution, diluted to a suitable viscosity for film application, were touch dry in 3 hours and tack free overnight, giving tough glossy coatings.

Example 11

Dehydrated castor oil fatty acids (23 grams), glycerol dially ether (26.4 grams), styrene (40 grams), butyl acrylate (5 grams) and maleic acid (2.9 grams) were mixed together and warmed to give a clear solution at 100° C. Ditertiary butyl peroxide (2 grams) was added and the mixture warmed to 130° C.

Heating at 130° C. was continued for 4 hours and then butyl Cellosolve (18.3 grams) was added to the viscous resin (acid value approximately 70) which was then cooled to room temperature.

The resin solution was stirred with triethylamine (8.70 grams) and water dispersible cobalt drier containing 6% cobalt metal (2 grams).

Films of the above solution diluted with water were touch dry in 2¾ hours and tack free after 6¾ hours. The films were colourless, hard and glossy.

Example 12

The procedure of the last example was repeated using an equal weight of fumaric acid instead of maleic acid. Films of the resulting copolymer triethylamine salt were touch dry in 2¾ hours and tack free in about 7 hours.

Example 13

Glycerol diallyl ether (26.4 grams), dehydrated castor oil fatty acids (23 grams), styrene (40 grams), butyl acrylate (5 grams) and itaconic acid (3.25 grams) were warmed to 100° C. until a clear solution resulted and then ditertiary butyl peroxide (2 grams) was added and the mixture warmed to 130° C.

Heating at 130° C. was continued until a viscous copolymer was produced which took approximately 4 hours. The copolymer which had an acid value approximately 70 was thinned with butyl Cellosolve (20 gms.) and then cooled to room temperature and then stirred with triethylamine (8.7 gms.) followed by water dispersible cobalt drier (2 gms.).

Films of the above solution, diluted with water to a suitable viscosity for film application, were touch dry in 3 hours and tack free after about 7 hours.

Example 14

Glycerol dially ether (65.2 gms.), dehydrated castor oil fatty acids (10.5 gms.) were heated to 130° C. and a mixture of ethyl acrylate (78 gms.), acrylic acid (10.5 gms.), ditertiary butyl peroxide (1.5 gms.) and carbon tetrachloride (4 gms.) was added slowly over 3 hours. When the addition was completed, heating at the reflux was continued for 3 hours, then carbon tatrachloride, unreacted monomers were distilled off under reduced pressure until no distillation occurred at 120° C. and 25 nm. Hg.

The residual copolymer (105 gms.) was stirred with butyl Cellosolve (20 gms.) and triethylamine (10 gms.) followed by water dispersible cobalt driers containing 6% cobalt metal (2 gms.). This solution was completely water soluble and films of the aqueous solution were tack free after air drying overnight.

Example 15

The maleinised soya fatty acids of Example 5 (69 gms.), water (5 gms.) and triethylamine (0.5 gm.) were heated at 90–95° C. for 1 hour under reflux to hydrolyse the anhydride groupings in the adduct. Glycerol diallyl ether (157 gms.) and an ester prepared from equimolar quantities of triethylene glycol and dehydrated castor oil fatty acids (46 gms.) were charged after the hydrolysis stage was completed and the temperature was raised to 130–140° C.

When this temperature had been reached a mixture of styrene (200 gms.), acrylic acid (17 gms.) and ditertiary butyl peroxide was added slowly over 3 hours, holding the reaction temperature between 130°–140° C.

After completion of the addition, heating was continued at 130–140° C. for 30 minutes then butyl Cellosolve (100 gms.) was charged to the viscous copolymer which had an acid value of about 70 and the batch was cooled to room temperature. Finally triethylamine (45 gms.) was stirred in, followed by water dispersible cobalt drier containing 6% cobalt metal (10 gms.). This solution was dilutable with water and films of the aqueous solution were touch dry in 3 hours, tack free overnight.

I claim:

1. An addition copolymer comprising units formed by the copolymerization of:

(a) 2 to 10 percent by weight of an $\alpha,\beta$-ethylenically unsaturated carboxylic acid;

(b) 10 to 75 percent by weight of a polyethylenically unsaturated compound containing at least one $\beta,\gamma$-ethylenically unsaturated ether group and an ethylenically unsaturated group through which addition polymerization can take place;

(c) at least 10 percent by weight of an ethylenically unsaturated monomer free from carboxylic acid and carboxylic acid anhydride groups which is capable of undergoing addition polymerization to form addition polymers with the polymers with the other components used to form the copolymer; and (d) 4 to 45 percent by weight of a drying oil fatty acid or 3 to 26 percent by weight of an adduct formed by reacting substantially equimolar quantities of the drying oily fatty acid with an acyclic $\alpha$-unsaturated olefinic polycarboxylic acid or anhydride thereof having a straight chain length of up to 5 carbon atoms;

wherein the proportions by weight are in relation to the total weight of the monomer mixture used to form the copolymer and the copolymer has an acid value of at least 25 milligrams of potassium peroxide per gram.

2. An addition copolymer according to claim 1 wherein the acid value is in the range of 25 to 100 milligrams of potasisum hydroxide per gram.

3. An addition copolymer according to claim 1 wherein the proportion by weight of the polyethylenically unsaturated compound containing at least one $\beta,\gamma$-ethylenically unsaturated ether group (b) together with the acid or adduct (d) in relation to the total weight of the components (a), (b), (c) and (d) of the monomer mixture from which it is formed is in the range 20 to 80 percent.

4. An addition copolymer according to claim 1 wherein the $\alpha,\beta$-ethylenically unsaturated carboxylic acid (a) is a mono or dicarboxylic acid having a straight chain length of up to 5 carbon atoms.

5. An addition copolymer according to claim 1 wherein the $\alpha,\beta$-ethylenically unsaturated carboxylic acid (a) is acrylic acid.

6. An addition copolymer according to claim 1 wherein the polyethylenically unsaturated compound containing at least one $\beta,\gamma$-ethylenically unsaturated ether moiety (b) is an allyl, methallyl or ethallyl ether of an alcohol having a straight chain length of 2 to 12 carbon atoms.

7. An addition copolymer according to claim 1 wherein the polyethylenically unsaturated compound containing at least one $\beta,\gamma$-ethylenically unsaturated ether group (b) is a glycerol diallyl ether.

8. An addition copolymer according to claim 1 wherein the ethylenically unsaturated monomer free from carboxylic acid and carboxylic acid anhydride groups (c) is an aromatic compound containing vinyl unsaturation, a vinyl ester or an ester or amide of $\alpha,\beta$-ethylenically unsaturated carboxylic acids.

9. An addition copolymer according to claim 1 wherein the ethylenically unsaturated monomer free from carboxylic acid and carboxylic acid anhydride groups (c) is styrene.

10. An addition copolymer according to claim 1 wherein the drying oil fatty acid (d) has at least 18 carbon atoms per molecule.

11. An addition copolymer according to claim 1 wherein the drying oil fatty acid (d) is dehydrated castor oil fatty acid.

12. An addition copolymer according to claim 1 wherein the acid adduct (d) is an adduct of soya fatty acid and maleic acid or anhydrides of maleic or substituted maleic acid.

13. A process for producing addition copolymers which comprises addition polymerizing at a temperature in the range of 50 to 200° C.:

(a) 2 to 10 percent by weight of an $\alpha,\beta$-ethylenically unsaturated carboxylic acid;

(b) 10 to 75 percent by weight of polyethylenically unsaturated compound containing at least one $\beta,\gamma$-ethylenically unsaturated ether group and an ethylenically unsaturated group through which addition polymerization can take place;

(c) at least 10 percent by weight of an ethylenically unsaturated monomer free from carboxylic acid and carboxylic acid anhydride groups which is capable of undergoing addition polymerization to form addition polymers with the other components used to form the copolymer; and (d) 4 to 45 percent by weight of a drying oil fatty acid or 3 to 26 percent by weight of an adduct formed by reacting substantially equimolar quantities of the drying oil fatty acid with an acyclic $\alpha$-unsaturated olefinic polycarboxylic acid or anhydride thereof having a straight chain length of up to 5 carbon atoms;

in the presence of a chain stopper which has a chain transfer constant for styrene polymerization at 60° C. of at least $0.5 \times 10^{-4}$ to give a copolymer having an acid value of at least 25 milligrams of potassium hydroxide per gram.

14. A process according to claim 13 wherein the proportion by weight of chain stopper in relation to the total weight of the monomeric mixture has an upper limit of 60 percent.

15. A process according to claim 13 wherein the chain stopper is allyl alcohol.

16. Aqueous surface coating compositions containing water dilutable salts of addition copolymers according to claim 1.

References Cited

UNITED STATES PATENTS

| | | | |
|---|---|---|---|
| 2,839,514 | 6/1958 | Shokal et al. | 260—88.1 |
| 2,852,487 | 9/1958 | Maker | 260—861 |
| 3,030,321 | 4/1962 | Lombardi et al. | 260—23 |
| 3,098,834 | 7/1963 | Jerabek | 260—23.7 |
| 3,247,139 | 4/1966 | Christenson et al. | 260—21 |
| 3,253,938 | 5/1966 | Hunt et al. | 160—252 |
| 3,297,557 | 1/1967 | Huggard | 204—181 |

OTHER REFERENCES

Schidknecht: "Vinyl and Related Polymers," 1952, p. 15, copy in Group 140.

DONALD E. CZAJA, *Primary Examiner.*

R. A. WHITE, *Assistant Examiner.*